July 31, 1951 — A. RAPPL — 2,562,819

WINDSHIELD CLEANER

Filed Jan. 26, 1949

INVENTOR
Anton Rappl
BY
Bean, Brooks, Buckley & Bean
ATTORNEYS

Patented July 31, 1951

2,562,819

UNITED STATES PATENT OFFICE 2,562,819

WINDSHIELD CLEANER

Anton Rappl, Eggertsville, N. Y., assignor to Trico Products Corporation, Buffalo, N. Y.

Application January 26, 1949, Serial No. 72,962

5 Claims. (Cl. 15—250.4)

This invention relates to the windshield cleaning art and especially to the type wherein water or other liquid solvent is applied to the windshield surface for loosening congealed matter thereon preliminary to squeegeeing the surface free of such matter.

A very practical mode heretofore employed necessitated the throwing of a liquid stream through space onto the windshield surface with the result that the stream would, at times, be spread over a wide area by the air currents and even carried outside the path of the reciprocating wiper to no advantage.

The primary object of this invention is to apply the solvent more effectively and with a minimum waste.

Furthermore, the invention has for its object to provide a wiper with solvent applying means incorporated in it for controllably distributing the solvent and applying it to advantage for greatest wiping efficiency.

Figure 1:
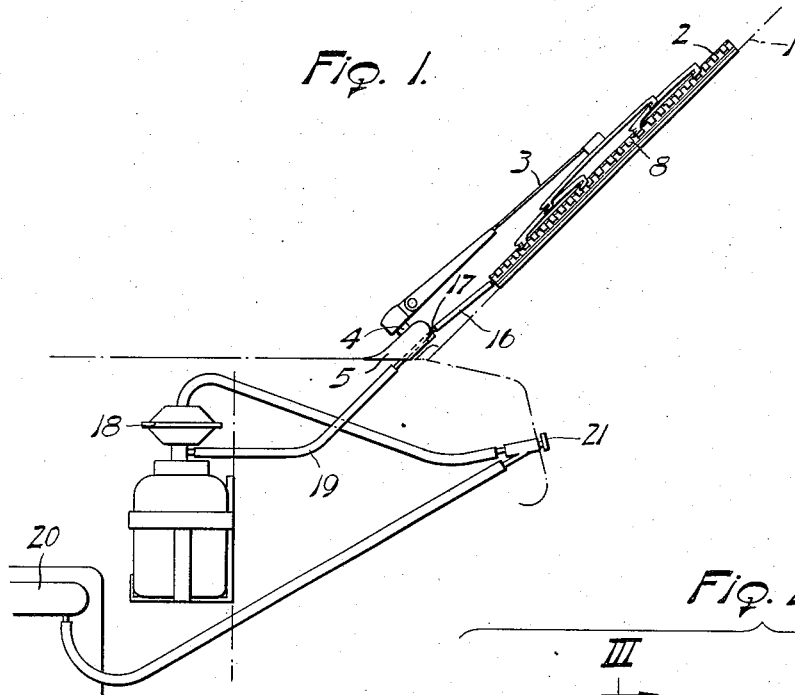
Figure 2:
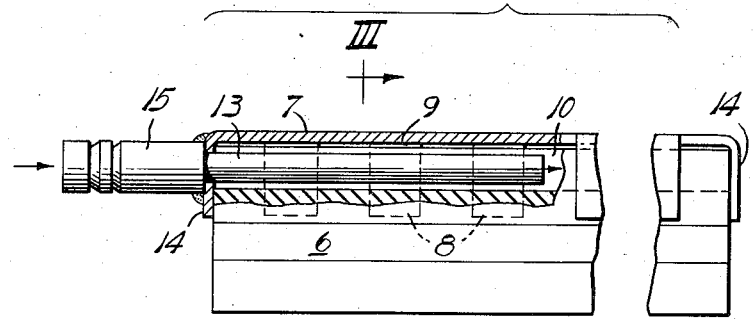
Figure 3:
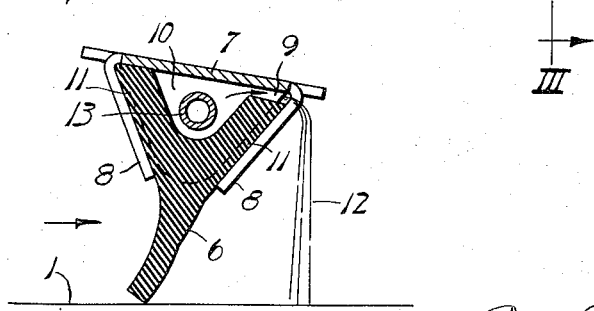

The foregoing and other objects will manifest themselves as this description progresses, reference being made therein to the accompanying drawing, wherein Fig. 1 is a diagrammatic view showing a practical application of the present invention;

Fig. 2 is a fragmentary view of the wiper or wiping blade partly in side elevation and partly in section lengthwise of the wiper; and Fig. 3 is a transverse section of the wiper about on line 3—3 of Fig. 2.

Referring more particularly to the drawing, the numeral 1 designates the windshield of a motor vehicle over which the wiper 2 is reciprocated by the arm 3 fixed to the oscillatory shaft 4. This shaft is journaled in a cowl supported housing 5 and driven from a source of power, not shown.

The wiper comprises an elastic squeegee body 6—it may be of rubber—and a channeled holder 7 therefor, the sides of the channel being in the form of rows of fingers 8 which loosely embrace the squeegee body and permit the latter rocking on its wiping edge at the start of each stroke to assume a rearwardly inclined or dragging position somewhat as depicted in Fig. 3. In so rocking, the forward side edge of the body is spaced from the holder to form therewith a discharge passage 9 laterally from a duct or groove 10 in the back of the body which groove divides the back into opposite side edges or margins 11. Upon a reversal of wiper movement the opposite side edge or margin of the body will open up its discharge opening 9 while the other discharge opening will close. The feed duct or groove 10 divides one side edge or margin from the other and when one margin seats upwardly against the underside of the holder it seals such side against fluid leakage. Therefore, the full force of the delivered pressure will be effective upon the liquid which flows out over the forward side margin and down onto the windshield surface, as indicated at 12.

The liquid solvent may be delivered to the feed duct or groove 10 through a blade carried tube or nozzle 13 which is mounted to extend through one of the terminal downturned ears 14 and preferably in a direction longitudinally of the groove. These ears overlie the opposite ends of the squeegee body to retain it in place within the holder channel. A nipple 15 extends from the outer end of the tube and projects from the blade for receiving a flexible hose 16, which latter connects to a nipple 17 on the housing 5. The nipple or pipe 17 is joined to a pump 18 by a conduit 19 for receiving the liquid solvent under pressure from the pump. This pump may be of any suitable form, the one illustrated being operated off the intake manifold 20 and controlled by a readily accessible valve 21, this type of pump being well known and is generally disclosed in the earlier Patent No. 2,206,814. The wiping blade illustrated is flexible to follow the surface of curved windshields, the channeled holder 7, 8 being flexible for this purpose. The discharge nozzle 13 need extend but a short distance into the liquid distributing duct or groove 10 so as to permit such conformance of the blade to the curved surface.

In practice the control valve 21 is opened to enable the pump operating on its intake stroke, and then closed so that the pump may function to eject the liquid through the nozzle 13 into the blade where it will be discharged over the forward edge or margin of the squeegee body and into the path of the oncoming wiper. Upon the reverse stroke the water will be discharged over the opposite edge which will then be leading. The water being thus applied to the windshield surface from the wiping blade will act to flood the surface for greater efficiency in loosening congealed matter in the field of vision.

The foregoing description has been given in detail without thought of limitation since the inventive principles involved are capable of assuming other physical embodiments without departing from the spirit of the invention and the scope of the appended claims.

What is claimed is:

1. A reciprocatory wiping blade having a channeled holder with side walls open at intervals for the discharge of liquid therethrough, and a squeegee body arranged within the holder channel and loosely embraced by the side walls thereof for limited rocking on its wiping edge at the start of each stroke for assuming a dragging position with respect to the holder, the body having a back wall formed with a longitudinal groove defined by uninterrupted longitudinal margins over which the liquid may flow through the open sides of the channeled holder, said longitudinal margins alternately opening from and closing upon the channel during its rocking therein and when in an open position serving to define an overflow space at the forward side of the blade, with respect to the direction of travel of the blade, and means for flowing liquid into the groove in the back of the body.

2. A reciprocatory wiping blade having a channeled holder, and a squeegee body arranged within the holder channel and loosely embraced by the walls thereof for limited rocking on its wiping edge at the start of each stroke for assuming a dragging position with respect to the holder, the body having a back face divided by a longitudinal groove to provide margins at opposite sides of the groove alternately engaging the holder during rocking movement of the body to seal one margin and to space the opposite margin from the holder to provide an opening for liquid flow thereover into the path of the advancing body.

3. A reciprocatory wiping blade having a channeled holder, a squeegee body arranged within the holder channel and loosely embraced by the walls thereof for limited rocking on its wiping edge at the start of each stroke for assuming a dragging position with respect to the holder, the body having a back face divided by a longitudinal groove to provide margins at opposite sides of the groove alternately engaging the holder during rocking movement of the body to seal one margin and to space the opposite margin from the holder to provide an opening for liquid flow thereover into the path of the advancing body, and means arranged for delivering liquid into the back groove of the body.

4. A reciprocatory wiper comprising an elongate holder having a back wall, an elongate squeegee body having a wiping edge, said body also having a back wall opposing the back wall of the holder, said holder having means mounting the body thereon for rocking movement about the wiping edge to enable the squeegee body assuming a dragging position with respect to the holder at the start of each wiper stroke, the opposite longitudinal margins of the second back wall alternately contacting the opposite longitudinal margins of the back wall of the holder to limit such rocking movement of the body, the forward margins of the two back walls with respect to the direction of travel of the wiper being spaced apart to define an overflow opening in front of the dragging wiping edge, and means for delivering a flow of liquid between the two back walls for outflow over the forward margin of the back wall of the squeegee body.

5. A reciprocatory wiper comprising an elongate holder having a back wall, an elongate squeegee body having a wiping edge, said body also having a back wall opposing the back wall of the holder, said holder having means mounting the body thereon for rocking movement about the wiping edge to enable the squeegee body assuming a dragging position with respect to the holder at the start of each wiper stroke, the opposite longitudinal margins of the second back wall alternately contacting the opposite longitudinal margins of the back wall of the holder to limit such rocking movement of the body, the forward margins of the two back walls with respect to the direction of travel of the wiper being spaced apart to define an overflow opening in front of the dragging wiping edge, one back wall having a longitudinal groove separating its margins, and means for delivering liquid to the wall groove.

ANTON RAPPL.

REFERENCES CITED

The following references are of record in the file of this patent:

UNITED STATES PATENTS

| Number | Name | Date |
| --- | --- | --- |
| 1,795,964 | O'Conner | Mar. 10, 1931 |
| 1,857,419 | Williams | May 10, 1932 |
| 1,868,783 | Williams | July 26, 1932 |
| 2,069,699 | Dohler | Feb. 2, 1937 |
| 2,333,854 | Fuller | Nov. 9, 1943 |
| 2,348,502 | Smulski | May 9, 1944 |
| 2,432,690 | Smulski | Dec. 16, 1947 |